United States Patent Office 2,977,608
Patented Apr. 4, 1961

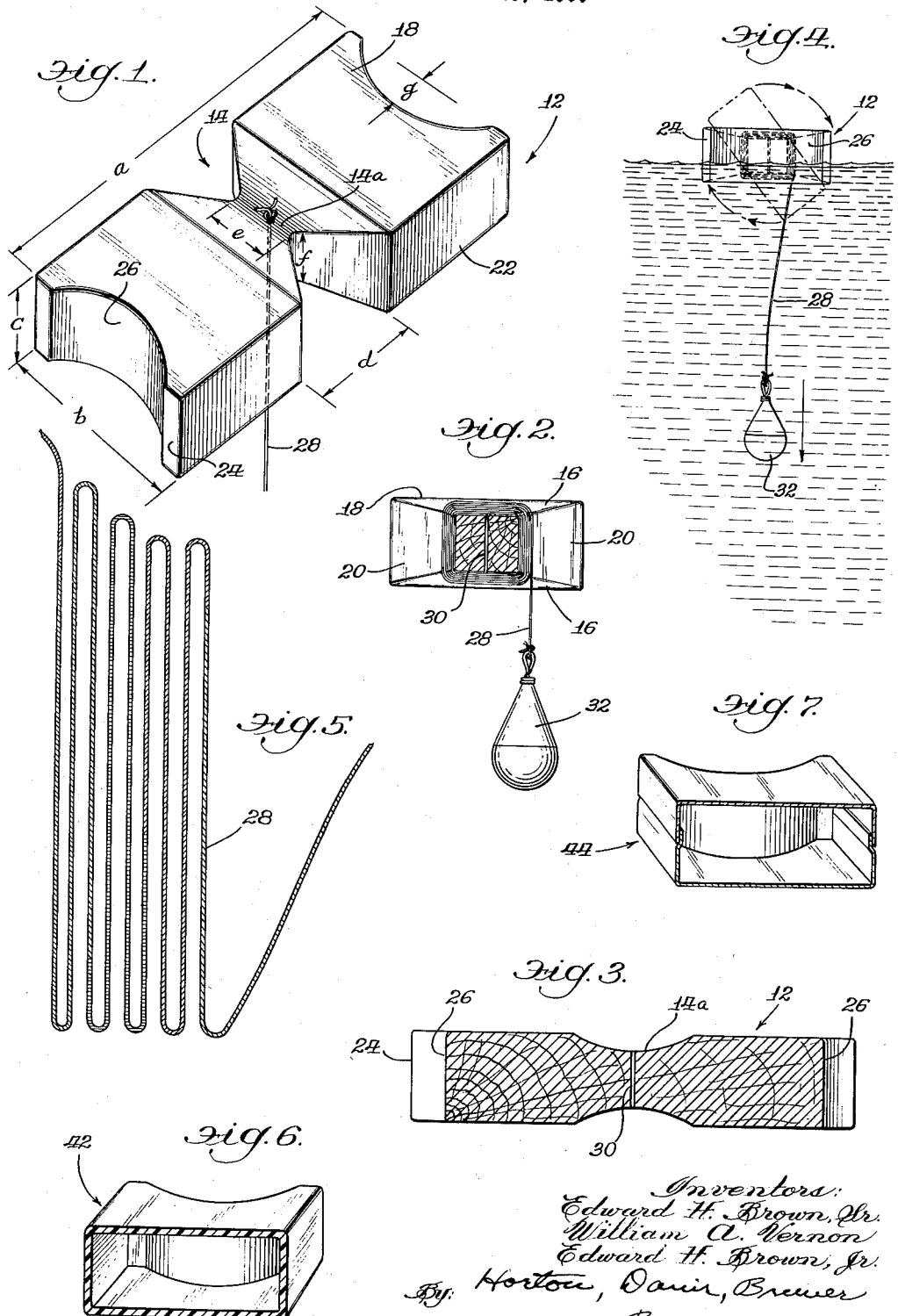

2,977,608

FISHING SPOT MARKER

Edward H. Brown, Sr., 2424 Lawndale Ave., William A. Vernon, 2515 Orrington Ave., and Edward H. Brown, Jr., 1501 Lincoln St., all of Evanston, Ill.

Filed Feb. 23, 1960, Ser. No. 10,204

10 Claims. (Cl. 9—8)

The present invention relates to a fishing spot marker. The device of the present invention finds great utility in the case of marking a certain spot in the water in a fishing expedition. It is known that fish generally move in schools and when a fish bites, that fish very often, and usually, is one of a school, and the fisherman in landing that fish quite often moves or migrates from the spot at which the bite was made, and after fish is landed he wishes to return to the site of the school so as to take the best opportunity for getting another bite by another fish in that same school. However, due to illusions so prevalent on water, it is extremely difficult to judge the exact location where the bite was made and from which he drifted. Accordingly, it is desired to mark that location by some form of device that is completely visible and remains in the location at which it is placed, to serve as a guide for the location or site to which the fisherman wishes to return.

There have previously been different kinds of devices for marking locations in the water, regardless of whether they are to be used in connection with fishing or other activities, but the present device is a greatly simplified and economical device, and believed to be a vast improvement over all forms of device heretofore known for the general purpose stated.

A broad object, therefore, of the present invention is to provide a fishing spot marker that is completely and basically new.

Another object is to provide a marker of the general character noted which includes a float, a flexible line connected to the float, and a sinker connected to the line, and which, in a wound condition suitable for placement in a tackle box when not being used, is thrown into the water for marking a desired spot, wherein when so thrown into the water, the sinker sinks to the bottom and the float rotates to enable the line to unwind and the float to remain on top of the water; and additionally wherein when the sinker reaches bottom, the unwinding operation ceases and the float remains anchored in position without further unreeling or possibility of drifting.

Another object is to provide a marker of the general character noted above which is of extreme simplicity and hence is economical in manufacturing.

A further object is to provide a marker of the kind referred to which is highly visible, partially because the float remains positioned at a relatively high position with respect to the surface of the water and also because it is of such nature as to present a large area to view.

A further object is to provide a marker of the general character noted having a flexible line made up of segments of successively different colors whereby to function as a depth gauge, or depth check.

Other objects and advantages of the invention will appear from the following detail description taken in conjunction with the accompanying drawing in which—

Figure 1 is a perspective view of the float of the novel marker of the present invention;

Fig. 2 is a transverse sectional view through the float and showing the flexible line wound thereon and including the sinker;

Fig. 3 is a longitudinal secional view of the float of the marker;

Fig. 4 is a view of the marker in water, and indicating the mode of functioning thereof;

Fig. 5 is a large scale detailed view of a portion of the flexible line;

Fig. 6 is a transverse sectional view of a float made of an alternative kind of material; and Fig. 7 is a view similar to Fig. 6 showing a float made of still another kind of material.

Attention is now directed to the accompanying detail drawings of the fishing spot marker of the present invention and referring particularly to Fig. 1, the float is shown in its entirety in this view at 12. The float 12 for convenience may be considered as having a length indicated at $a$, a width indicated at $b$, and a thickness indicated at $c$. The float is in general in the form of a block having an outline contour of the dimensions and in the directions indicated, but the block is provided with surfaces other than the outline surfaces.

The float 12 is provided with a central reduced waist or neck portion indicated in its entirety at 14. The most significant dimension of the waist portion 14 is its width $e$ at its centermost portion 14a, this width dimension having certain relation to the width $b$ of the float as a whole, as will be pointed out more in detail hereinbelow. This centermost portion 14a has a thickness indicated at $f$ also preferably slightly less than the thickness $c$ of the float, por a purpose referred to hereinbelow. The reduced waist portion 14 has a length indicated at $d$, considered relative to the corresponding length dimension $a$ of the float. The waist portion 14 is formed by oppositely tapered surfaces 16 leading in from the corresponding flat side surfaces 18 of the float, and similar tapered surfaces 20 leading in from the corresponding side edge surfaces 22, the waist portion 14 thus being formed as by a notched formation.

Preferably the end surfaces indicated at 24 of the float are shaped to have concave portions indicated at 26, the depth of such concave portions being indicated at $g$.

A flexible line 28 is secured at one end to the float in the centermost portion 14a of the waist in a suitable manner such as by inserting the end of the line through a hole 30 thereon and forming a knot in the end of the line, or by tying it around the waist portion, or by tying it to a hook secured to the waist portion, or in any other desired and effective manner. The line 28 may be formed of any desired material such as nylon to provide the desired flexibility and strength, and of course may be of any desired length.

Secured to the opposite end of the flexible line 28 is a sinker 32, of suitable kind and shape. Additional details of relations between the parts will appear hereinbelow.

In the use of the marker the flexible line 28 is completely wound on the waist 14 as shown in Fig. 2, and in this condition of the marker it can be carried among other fishing gear such as in an individual box, in a tackle box, or even left loose among other items. When it is desired to mark a spot or site in the water, the marker with the line wound thereon in the condition just described is simply thrown into the water. The sinker 32 is sufficiently heavy, as explained more fully hereinbelow, to cause unwinding of the line from the float in the following manner: the weight of the sinker causes a turning moment on the waist portion corresponding to the transverse dimension of the width of the waist at its effective portion, namely, the portion 14a. This moment is exerted on the main portion of the float in accordance with the resistance determined at least in part by the width thereof, or dimension $b$. In this function, the one edge (right edge, Fig. 2) lowers into the water, and the opposite edge consequently rises at least partially above the surface of the water, according to various relative dimensions and widths, as described more fully hereinbelow, and in the process, the float turns or flips over. Continued descent of the sinker in the water results in rotating or spinning of the float, in a continued unreeling action. In this operation the float remains at the surface of the water, i.e., partially submerged and partially disposed above the water. When the sinker reaches bottom, the forces tending to rotate or spin the float due to the descent of the sinker are expended, and as a result, the float remains in a stable position without further unreeling.

It will be appreciated that upward surges of the water at the vicinity of and exerted on the float tend to produce a rotating effect thereon in an action similar to that caused by the descent of the sinker, but we have found that the float remains in the same location after the sinker reaches bottom and does not drift. The float may be turned or flipped over by the upsurging water, in an unreeling direction, but it will again be turned over in the opposite or reeling-up direction, all together resulting in random action, and the net result is that the float remains in the spot where it was dropped into the water. The fisherman or other user of the marker thus can readily locate his original location. The float is relatively wide ($b$) as compared with its thickness ($c$) and forms a relatively flat article having expansive flat sides (18) on which it rests in floating, and consequently it is not easily turned over by upsurging water.

The float 12 may be made of any of various materials that are lighter than water. For example, the float of Fig. 1 is shown to be made of wood as represented in Fig. 3 while in Fig. 6 is shown a fragment of a float 42 made of plastic. The plastic float 42 of Fig. 6 is hollow and may be formed by any of the presently known methods, such as by molding halves and later bonding or welding them together. In the present instance, the float may possess very great buoyancy due to its hollow construction.

In Fig. 7 is shown a fragment of a float 44 which is also hollow and fabricated by forming two metal halves, of such material as aluminum, and securing them together as by soldering, etc. In the present case also the hollow construction provides extremely high buoyancy.

The absolute buoyancy of the float is one of several factors affecting the functioning of the marker, other factors being relative dimensions, weights, etc. The buoyancy of the float may be such, for example, that it floats in a position indicated in Fig. 4, where it is approximately 40% submerged and 60% above water. The large flat surfaces 18 of the float provide substantial area for rendering the float highly visible at a considerable distance. Also the fact that a substantial portion is above water adds to the visibility, not only because of the added exposed edge surfaces, but also by reason of the fact that the large upper surface 18 is disposed considerably above the surface of the water and is thereby highly visible.

The degree of buoyancy of the float also affects the speed of rotation or spinning motion due to the descent of the sinker, for any given weight of sinker. For example, as noted above, the one edge of the float must enter into the water in order for the float to turn or flip over since the opposite edge will not rise when the first edge is only on top of the water. Accordingly, the greater the buoyancy, the greater weight of sinker will be necessary to rotate or spin a float of any given size and proportions.

Another principal factor, if not the most critical factor in determining the ease of rotation or spinning of the float is the width $b$. It will be understood that if it should be attempted to utilize a float of uniform width and thickness, the float would irresistably rotate or spin in the water, not only while the sinker was descending, but also due to any slightest upsurge of the water after the sinker reached bottom. Therefore the waist or reduced portion 14 on which the line is wound must be of lesser width $e$ than the corresponding width $b$ of the main portion of the float. Comparison may be made with another extreme condition in which the centermost and smallest portion 14a of the waist should be much smaller than that indicated; an extremely heavy sinker would be required for lowering the first edge of the float below the surface of the water sufficiently to enable the rotation to be produced, considering the turning moment corresponding to the width of the waist relative to that corresponding to the width $b$ of the main portion.

The desired proportions between the various factors that are selected may be embodied in a float regardless of the ultimate overall size of the marker, as it will be understood that the marker may be of any size for convenience. However, in handling the marker, a certain maximum size should be considered. For example, we have found that the following size and proportions result in a marker that is of convenient size and functions highly satisfactorily:

| | Inches |
|---|---|
| Length $a$ | 5⅛ |
| Width $b$ | 2¼ |
| Thickness $c$ | 1 |
| Length $d$ of the waist | 1⅜ |
| Width $e$ of the waist | ¾ |
| Thickness $f$ of the waist | ⅝ |
| Depth $g$ of the concave surface 26 | 5/16 |

These dimensions are not critical, and it is within the scope of the invention to vary any and all of these dimensions within a wide range with satisfactory and good performance.

It will be understood that the rate of descent of the sinker need not be any particular rate, and thus any of the elements that affect the rate of rotation of the float and hence rate of descent of the sinker may be altered within a wide range.

We have found that for a float of the dimensions given above, a weight of approximately 2½ ounces is satisfactory, this weight being that of a wood material, and a sinker weighing approximately 2 ounces produces excellent results in the rotating or spinning action of the float, i.e., the float may be in the neighborhood of 25% heavier than the sinker.

The provision of the concave areas 26, formed by cutting in from the ends of an otherwise regular polygonal outer contour reduces the mass of the float and to that extent facilitates rotation or spinning of the float for any given set of other factors. This reduction of mass is permitted while maintaining the full overall length $a$ and width $b$ of the float, the width $b$ being the most critical factor in that it determines the greatest resistance to the turning moment caused by the string while the length $a$ for any given width $b$ provides additional increments of the float, all of the same width $b$ and to that extent adding to the resistance or reaction as determined by the width $b$.

The reduced thickness $f$ of the waist provides a recessed portion in which the line 28 may be wound within the confines of the float as determined by the opposite flat surfaces 18 to facilitate packing the marker so that the float may rest on its flat surfaces when the line is wound thereon.

An additional advantage of the marker resides in the feature that the line 28 constitutes a depth check. Successive segments of the line 28 are of different colors, as indicated in Fig. 5. For example, these color changes may be at 5 foot intervals and the fisherman can determine the depth of the water at the location of the marker by counting the segments of the unwound portion pursuant to withdrawing from the water.

The simplicity of the device is now evident, the marker being made up of three main parts, namely, the float, the line, and the sinker. The float is of uniform composition, i.e., as to material used, and the manufacturing operations of applying the line to the float and the sinker tothe line are simple operations. The float is easily and simply treated for water proofing, as contrasted with a marker made of many and intricate parts and conformations. The float may be colored in a brilliant color so as to be visible at great distances.

Although the marker of this invention finds great utility in connection with fishing, it will be understood that it is not limited thereto, but may be used in connection with marking any location and indicating any object in the water, as desired.

While we have shown a preferred form of device, it willbe understood that changes may be made therein within the scope of the appended claims.

We claim:

1. A marker of the character disclosed comprising a float having a main body including a central longitudinal axis, a width axis and a thickness axis, the thickness axis being substantially less than the width axis, whereby to provide a generally flat article capable of floating in water on a flat side, the float having a waist portion generally centrally longitudinally thereof which is of a width substantially less than the width of the main body, and which is also spaced inwardly a substantial distance from each side edge and has a substantial portion disposed on each of opposite sides of the longitudinal axis, said waist portion being also substantially symmetrical about the central longitudinal axis whereby all transversely alinged points on opposite side edges thereof at all positions longitudinally thereof are proportionally spaced from the longitudinal axis, the main body having end portions on opposite sides of the waist portion of full width extending a substantial distance longitudinally beyond the waist portion, a flexible line having one end secured to the waist portion, a sinker secured to the opposite end of the line, said line being adapted to be wound on the waist portion and the sinker being operative, when the float with the line wound thereon is placed in water, for rotating the float in a constant turning movement about its longitudinal axis, and sinking until it reaches bottom.

2. The invention set out in claim 1 wherein the waist portion has a small mid portion and inclined surfaces leading from the mid portion to the outer surfaces of the main body.

3. The invention set out in claim 2 wherein the width of the mid portion of the waist portion is on the order of one-third the width of the main body.

4. The invention set out in claim 1 wherein the specific weight of the float is such that it floats in water in a position in which it is on the order of 40% submerged.

5. The invention set out in claim 1 wherein the float has a thickness on the order of not more than one-half of its width.

6. The invention set out in claim 1 wherein the weight of the float is on the order of 25% greater than the weight of the sinker.

7. The invention set out in claim 1 wherein the end edge surfaces of the float are concave about axes extending in the thickness direction of the float.

8. The invention set out in claim 1 wherein the waist portion constitutes in the neighborhood of one-fourth the total length of the float.

9. The invention set out in claim 1 wherein the waist portion is of less thickness than the main body whereby to contain the line when wound on the waist portion within the limits in thickness direction as defined by the opposite flat sides of the float.

10. The invention set out in claim 1 wherein the line is of different colors at successive portions thereof whereby to serve as a visual depth gauge.

References Cited in the file of this patent
UNITED STATES PATENTS

| Number | Name | Date |
|---|---|---|
| 1,516,522 | Farr | Nov. 25, 1924 |
| 1,993,974 | McVicker | Mar. 12, 1935 |
| 2,490,876 | Lewis | Dec. 13, 1949 |
| 2,545,321 | Tumminello | Mar. 13, 1951 |
| 2,602,233 | Irving | July 8, 1952 |
| 2,941,217 | Hartl | June 21, 1960 |